(12) United States Patent
Kim et al.

(10) Patent No.: US 7,578,455 B2
(45) Date of Patent: *Aug. 25, 2009

(54) METHOD OF GRINDING PARTICULATE MATERIAL

(75) Inventors: Jin D. Kim, Dae-Jeon (KR); Wei Li, Troy, MI (US); Se H. Oh, Troy, MI (US)

(73) Assignee: General Motors Corporation, Detroit, MI (US)

( * ) Notice: Subject to any disclaimer, the term of this patent is extended or adjusted under 35 U.S.C. 154(b) by 879 days.

This patent is subject to a terminal disclaimer.

(21) Appl. No.: 10/914,418

(22) Filed: Aug. 9, 2004

(65) Prior Publication Data

US 2006/0027688 A1  Feb. 9, 2006

(51) Int. Cl.
*B02C 17/00* (2006.01)
(52) U.S. Cl. .......................... 241/5; 423/263; 423/579; 423/658.2; 423/279; 423/594.15; 423/594.16; 423/594.8; 423/594.14; 423/594.9; 423/594.7; 423/598; 241/15; 241/22; 241/30; 241/184
(58) Field of Classification Search .................. 241/30, 241/184, 5, 15, 22; 423/263, 579, 658.2, 423/279, 598, 594.15, 594.16, 594.8, 594.14, 423/594.9, 594.7; 502/303
See application file for complete search history.

(56) References Cited

U.S. PATENT DOCUMENTS

| 4,175,117 A | * | 11/1979 | Hill .................. 423/594.1 |
| 5,556,038 A | | 9/1996 | Nakamura et al. ............ 241/17 |
| 5,704,556 A | | 1/1998 | McLaughlin .................. 241/21 |
| 6,010,085 A | | 1/2000 | Angeletakis .................. 241/21 |
| 2002/0155948 A1 | | 10/2002 | Inoue |
| 2004/0089753 A1 | | 5/2004 | Holland et al. ................. 241/21 |

OTHER PUBLICATIONS

International Search Report mailed Jun. 27, 2006 for PCT/US05/27283 filed Aug. 1, 2005 corresponding to this application.
Hwang, D. W. et al, "Photocatalytic Water Splitting Over Highly Donor-Doped (110) Layered Perovskites," Journal of Catalysis 193, 40-48 (2000).
Kudo, A. et al., "Water Splitting into H2 and O2 on New Sr2M2O7 (M=Nb and Ta) Photocatalysts with Layered Perovskite Structures: Factors Affecting the Photocatalytic Activity," J. Phys. Chem. B 2000, 104, 571-575.
Machida, M. et al., "Photocatalytic Property and Electronic Structure of Lanthanide Tantalates, LnTaO4n (Ln = La, Ce, Pr, Nd, and Sm)," J. Phys. Chem. B 2001, 105, 3289-3294.

* cited by examiner

*Primary Examiner*—Steven Bos
(74) *Attorney, Agent, or Firm*—Reising Ethington P.C.

(57) ABSTRACT

A particulate material is ground more efficiently using a mixture of at least two different sizes of yttrium-stabilized zirconia balls. The method facilitates preparation of photocatalysts with high activity.

24 Claims, 1 Drawing Sheet

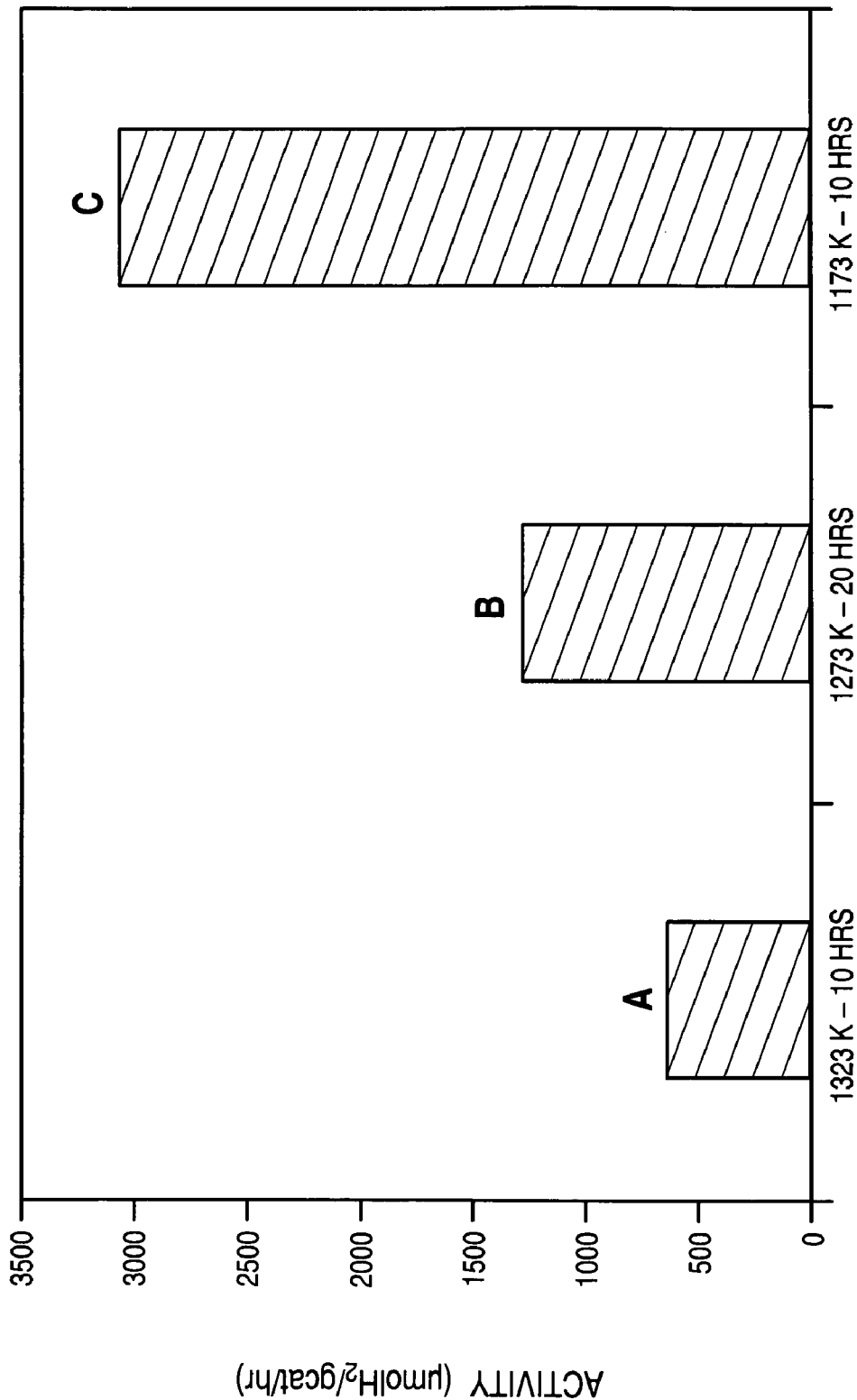

METHOD OF GRINDING PARTICULATE MATERIAL

FIELD OF THE INVENTION

The present invention relates generally to grinding methods, particularly for preparing precursors for calcination. The present invention also relates to photocatalysts for water splitting, methods of preparing photocatalytically effective compounds, and methods involving photocatalytic reactions.

BACKGROUND OF THE INVENTION

Photocatalytic water splitting has been studied as a way to harness solar energy by using it to generate clean, high energy-containing hydrogen from water, an abundant, inexpensive feedstock. Efforts have been directed toward producing compounds with higher catalytic activity in the photolysis of water. Catalytic activity of the titanium dioxide-based photocatalysts originally studied was improved with catalysts such as $Pt/TiO_2$ and $RuO_2/TiO_2$. Strontium-titanium oxide-based materials such as a reduced $SrTiO_3$/platinum electrode pair, $SrTiO_3$ powder modified with rhodium oxide, platinized $SrTiO_3$, and nickel-loaded $SrTiO_3$ have been studied, but the amount of absorbed photons used in the photolysis for these photocatalysts (the "quantum yield") is less than 1%. More recently, quantum yields of 5-10% have been obtained with layered structures of $K_4Nb_6O_{17}$, $K_4Ta_xNb_{6-x}O_{17}$, and $Rb_4Ta_xNb_{6-x}O_{17}$, and quantum yields as high as 30% have been obtained with $K_2La_2Ti_3O_{10}$ prepared in a polymerized complex method. The materials with improved quantum yield have interlayer reaction sites that can physically separate electron and hole pairs created by photoabsorption to retard electron-hole recombination. Even higher photocatalytic activity of the complex oxides would be desirable, however.

Complex oxide photocatalysts for water splitting have been prepared by several methods. In one method, the photocatalysts are prepared by grinding powder precursors, followed by calcination at high temperature. Conventional ball mill grinding requires a long processing time, however, after which the average particle size of the powder is still several microns. High-density yttrium-stabilized zirconia (YSZ) balls have been used for grinding. Another preparation method, the sol-gel process, is complicated and easily contaminated. Further, conventional grinding methods require severe calcinations conditions to optimize catalyst activity. Moreover, the catalysts prepared have suffered from poor homogeneity and poor crystallinity.

Thus, a need remains for a straightforward process for making photocatalytically active materials, as well as for such materials having higher catalytic activity.

SUMMARY OF THE INVENTION

An improved grinding method for preparing solid particulate material of very small average particle size has a step of grinding the material with a combination of yttrium-stabilized zirconia (YSZ) balls of different sizes, particularly high-density YSZ balls of different sizes. The grinding method is advantageous for preparing materials requiring small particle size, such as catalysts.

The grinding method of the invention is useful for producing materials with very small average particle sizes. One important area in which very small particles are used is in solid-state reactions, e.g., calcinations of mixtures of particulate inorganic compounds to produce complex oxides, which can be used as catalysts per se or doped with other metals for use as catalysts. The method can be used to make highly active photocatalysts for efficient water splitting to generate hydrogen.

Thus, in one embodiment, complex oxides with improved crystallinity are prepared by milling with a combination of high-density YSZ balls of different sizes. The product has a smaller particle size, greater surface area, more crystallinity, and more homogeneity than complex oxides produced by conventional grinding.

In another embodiment, photocatalysts for water splitting with increased activity are prepared by a method including a step of milling with a combination of high-density YSZ balls of different sizes. The photocatalysts can be used in a process of water splitting to generate hydrogen and oxygen.

In a further embodiment, photocatalysts for water splitting with increased activity are produced by a method including a step of milling with a mixture YSZ balls that have an average diameter of about 8 mm to 12 mm and YSZ balls of at least one smaller size. In particular, the YSZ balls of the at least one smaller size may have an average diameter of about 6 mm or less. This method is particularly advantageous using a mixture of high-density YSZ balls of these sizes. The photocatalysts are preferably complex oxides and can be used in a process of water splitting to generate hydrogen and oxygen.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

BRIEF DESCRIPTION OF THE DRAWINGS

The present invention will become more fully understood from the detailed description and the accompanying drawings, wherein:

The FIGURE is a bar chart illustrating photocatalytic activities of $Sr_2Ta_2O_7$ catalysts prepared with different grinding steps.

DETAILED DESCRIPTION OF THE PREFERRED EMBODIMENTS

The following description of the preferred embodiment(s) is merely exemplary in nature and is in no way intended to limit the invention, its application, or uses.

A grinding method for preparing solid particulate material of very small average particle size has a step of grinding the material with a mixture of yttrium-stabilized zirconia (YSZ) balls of different sizes, especially a mixture of high-density YSZ balls of different sizes. Ball milling with a combination of YSZ beads of different sizes is an efficient way to finely grind the precursor compounds. The YSZ beads are used in a mixture of at least two different sizes of balls.

It is particularly preferred to use two or more different sizes of high-density YSZ beads in admixture as the grinding medium. Although a mixture of standard density YSZ balls of different sizes provides more efficient grinding compared to use of standard density YSZ balls of a single size, the mixture of high-density YSZ balls of different sizes is even more efficient in grinding. The composition of high-density YSZ balls is 95% by weight $ZrO_2$ and 5% by weight $Y_2O_3$. YSZ balls are considered to be high-density when they have a true density of about 5.5 to about 6.5 kg/L, e.g. 6.0 kg/L. The preferred embodiments of the invention are described with reference only to the preferred high-density YSZ balls, although it should be understood that the inventive methods also provide improved grinding efficiency when applied to standard density YSZ balls as well.

In one embodiment, the mixture of high density YSZ beads include at least two sizes of YSZ beads having a ratio of diameters of from about 1.5:1 to about 5:1, more preferably from about 1.5:1 to about 2.5:1.

In another embodiment, the mixture of high density YSZ beads include at least three sizes of YSZ beads, in which the ratio of diameters of at least two of the sizes is from about 1.5:1 to about 5:1, more preferably from about 1.5:1 to about 2.5:1. In particular, the mixture of high density YSZ beads may include a first bead size of diameter from about 8 mm to about 12 mm, a second bead size of from about 2 mm to about 6 mm, and, optionally, a third bead size from about one-half to about one-fifth the diameter of the second bead. Bead diameters refer to nominal dimensions. A larger bead is included to provide sufficient force for efficient grinding of the precursor compounds, while the smaller sizes or sizes are included to provide a more compact grinding media with greater surface area.

The grinding method is suitable for comminuting any solid for which small particle size is desired and which may be ground by the mixture of YSZ beads. Among such solids are precursors for solid-state reactions. Mixed oxide crystals are produced by calcining oxides or carbonates of the desired metals. The precursor metal oxide and metal carbonate compounds are finely ground and then the mixed powders are calcined. The more finely ground precursor compounds ground by our method produce more regular mixed oxide crystal structures.

Among compounds with photocatalytic activity are layered perovskite-like crystalline materials having a general formula $A_mB_mO_{3m+2}$, in which m has a value of 4 or 5, A is a member of the group of elements Ca, Na, Ba, K, Sr, La, Ce, Pr, Nd, In, Pb, Bi, B, and Sn and B is a member of the group of elements Nb, Ta, Zn, Sn, and Ti. Suitable examples of precursor compounds for preparing catalysts include, without limitation, carbonates and oxides of the elements of group A and group B, such as strontium carbonate, tantalum(V) oxide, niobium(V) oxide, lanthanum oxide, calcium carbonate, barium oxide, titanium dioxide and so on.

The precursor compounds may be mixed and ground or ground separately and then mixed together before calcination. The precursor compounds are slurried in water and/or liquid alcohol for grinding. Examples of suitable liquids for slurrying the solids to be ground include, without limitation, water, ethanol isopropanol, n-propanol, isobutanol, n-butanol, tert-butanol, ethylene glycol, diethylene glycol, ethylene, and propylene glycol monoalkyl ethers such as propylene glycol monomethyl ether, cyclohexanol, glycerol, lower molecular weight polyethylene glycols, sec-butanol, and combinations of these. Methanol, while effective, is not preferred because it is too volatile and produces hazardous vapors.

In a particularly preferred embodiment, an inorganic or organic protonic acid is added to the slurry before grinding. Examples of suitable protonic acids that may be used include, without limitation, hydrochloric acid, hydrobromic acid, sulfuric acid, nitric acid, boric acid, phosphoric acid, propionic acid, trifluoracetic acid, acetic acid, lactic acid, oxalic acid, phosphonic acid, sulfonic acids, for example methanesulfonic acid, ethanesulfonic acid, p-toluenesulfonic acid, and dodecylbenzenesulfonic acid, citric acid, maleic acid, butyric acid, glycolic acid, phytic acid, formic acid, benzoic acid, acrylic acid, methacrylic acid, and combinations of these. Particularly preferred are nitric acid and acetic acid.

The optimal amount of protonic acid may vary depending on the particular acid selected, but in general the acid may be included in amounts of about 0.1% to about 5% of the liquid volume, especially in amounts of about 0.5% to about 2% of the liquid volume.

The precursor compounds are then ground with the mixture of different sizes of high density YSZ grinding media until a desired particle size is obtained. The precursor compounds can be ground to sub-micron size particles with the mixture of different sizes of high-density YSZ balls. The smaller particle size precursor compounds can be calcined under milder conditions (lower temperature, shorter duration) to provide mixed oxides with improved homogeneity, greater surface area, and higher crystallinity. Photocatalysts prepared by the method have much higher activities for water splitting.

After grinding, the ground precursor compounds are separated from the grinding media and dried. For example, precursor compounds may be dried in a forced-air or stagnant-air oven at temperatures above the boiling point of the liquid in which they are slurried.

When dry, the mixture of ground precursor compounds is calcined at a suitable temperature. An optimal window of times and temperatures for calcination may be determined by straightforward experimentation for maximum catalytic activity. In general, the grinding method of this invention provides an optimal calcinations temperature window that is lower than optimal calcinations temperature windows for materials prepared by conventional ball mill methods.

The crystalline product may then be impregnated with a metal cation to convert it to an active photocatalyst. Incipient wetness impregnation is a well-known method of loading active components by adding a solution of a soluble metal salt in water to the crystalline product powder until the powder reaches incipient wetness. Suitable examples of activating salts include, without limitation, nickel nitrate, nickel acetate, and $H_2PtCl_6$. After impregnation, the powder is dried and then calcined in air. Depending on the desired state of the added metal, the powder may also be subjected to reducing conditions (heat, hydrogen) for a desired time.

Examples of photocatalysts that may be produced by the methods of the invention include, without limitation, $La_2Ti_2O_7$, $Sr_2Nb_2O_7$, $Sr_2Ta_2O_7$, $NaTaO_3$, $LaTaO_4$, $La_2Ta_2O_7$, $K_2La_2Ti_3O_{10}$, $K_4Nb_6O_{17}$, $K_4Ta_xNb_{6-x}O_{17}$, $Rb_4Ta_xNb_{6-x}O_{17}$, $KHTiTaO_5$ and $HTiNbO_5$.

SEM and x-ray diffraction of the catalysts of the invention show increased crystallinity and increased surface areas. A photo catalyst prepared by the method of the invention may be used for photocatalytic splitting of water. The process of water splitting may include exposing the water to actinic radiation in the presence of the photocatalyst prepared by the method of the invention. Catalytic activity is increased compared to catalysts produced by previous methods.

The invention is further described in the following example. The example is merely illustrative and does not in any way limit the scope of the invention as described and claimed. All parts are parts by weight unless otherwise noted.

EXAMPLE OF THE INVENTION 1.67 grams $SrCO_3$ and 2.50 grams $Ta_2O_5$ were thoroughly mixed in a 50-ml glass bottle. An acid solution of 1 cc $HNO_3$ in 30 ml isopropanol was added to the mixture, which was then ground for 20 hours using high-density YSZ grinding media in a ball mill. The YSZ balls were separated from the ground precursor slurry, and the precursor slurry was dried in an oven at 423 K. The dried powders were calcined at 1173 K for 10 hours in static air. The calcined product was then converted to an active photocatalyst by loading 0.5 wt. % Ni metal by the incipient wetness impregnation method using $Ni(NO_3)_2.6H_2O$ to obtain NiO/Ni/perovskite. The impregnated material was dried in an oven at 373K and calcined at 573K in air for 1 hour.

The activity of the catalyst was determined to be 3250 µmol $H_2$ per gram catalyst per hour and 1625 µmol $O_2$ per gram catalyst per hour.

Comparative samples of NiO/Ni/perovskite catalyst were prepared by again combining 1.67 grams $SrCO_3$ and 2.50 grams $Ta_2O_5$ but the nitric acid in ethanol was not added and different grinding methods were used. For Comparative Example A, the precursor mixture was hand ground in agate. For Comparative Example B, the precursor mixture was ball milled using alumina balls. The remainder of the catalyst preparation was the same as for the Example of the Invention, except that the examples were optimized at different calcinations temperatures. Comparative Example A was calcined at 1323 K for 10 hours; Comparative Example B was calcined at 1273 K for 20 hours.

SEM photographs were taken of the Example of the Invention and of Comparative Examples A and B. after the grinding steps. The SEM photographs showed that the Example of the Invention had substantially smaller powder particles after the grinding steps. The photocatalytic activities of Comparative Examples A and B were measured and compared to that of the Example of the Invention. The FIGURE shows a bar graph of the results. The photocatalytic activity of the Example of the Invention was much higher than that of the Comparative Examples, which were prepared using conventional grinding techniques. Further, it is noted that the photocatalyst of the invention was optimized at milder calcination conditions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of grinding a particulate material, comprising a step of grinding the particulate material with a mixture of at least two different sizes of high-density yttrium-stabilized zirconia balls to reduce the particle size of the particulate material, wherein the high-density yttrium-stabilized zirconia balls comprise at least two sizes of yttrium-stabilized zirconia balls having a ratio of diameters of from about 1.5:1 to about 5:1.

2. A method according to claim 1, wherein the high-density yttrium-stabilized zirconia balls comprise at least two sizes of yttrium-stabilized zirconia balls having a ratio of diameters of from about 1.5:1 to about 2.5:1.

3. A method of carrying out a solid-state reaction between two particulate materials, comprising a step of grinding a mixture of the particulate materials with a mixture of at least two different sizes of high-density yttrium-stabilized zirconia balls, wherein the high-density yttrium-stabilized zirconia balls comprise at least two sizes of yttrium-stabilized zirconia balls having a ratio of diameters of from about 1.5:1 to about 5:1, and then calcining the mixture of ground particulate materials.

4. A method according to claim 3, wherein the high-density yttrium-stabilized zirconia balls comprise at least two sizes of yttrium-stabilized zirconia balls having a ratio of diameters of from about 1.5:1 to about 2.5:1.

5. A method according to claim 3, wherein the high-density yttrium-stabilized zirconia balls comprises at least three sizes of zirconia balls.

6. A method of preparing a photocatalyst, comprising grinding a mixture of precursor compounds with a mixture of at least two sizes of high-density yttrium-stabilized zirconia balls to reduce the particle size of the precursor compounds, wherein the precursor compounds comprise metal oxide and metal carbonate compounds, and calcining the mixture of ground precursor compounds.

7. A process of water splitting, comprising a step of exposing the water to actinic radiation in the presence of a photocatalyst prepared according to the method of claim 6.

8. A method of preparing a photocatalyst according to claim 6, wherein the high-density yttrium-stabilized zirconia balls comprise at least three sizes of yttrium-stabilized zirconia balls, in which the ratio of diameters of at least two of the sizes is from about 1.5:1 to about 5:1.

9. A method of preparing a photocatalyst according to claim 6, wherein the high-density yttrium-stabilized zirconia balls comprise at least three sizes of yttrium-stabilized zirconia balls, in which the ratio of diameters of at least two of the sizes is from about 1.5:1 to about 2.5:1.

10. A method of preparing a photocatalyst according to claim 6, wherein the high-density yttrium-stabilized zirconia balls comprise at least a fraction of yttrium-stabilized zirconia balls having a first bead size with diameter of from about 8 mm to about 12 mm.

11. A method of preparing a photocatalyst according to claim 10, wherein the high-density yttrium-stabilized zirconia balls comprise at least a fraction of yttrium-stabilized zirconia balls having a second bead size with diameter of from about 2 mm to about 6 mm.

12. A method of preparing a photocatalyst according to claim 11, wherein the high-density yttrium-stabilized zirconia balls comprise at least a fraction of yttrium-stabilized zirconia balls having a third bead size of from about one-half to about one-fifth the diameter of the second bead size.

13. A method of preparing a photocatalyst, comprising grinding a mixture of precursor compounds with a mixture of yttrium-stabilized zirconia balls to reduce the particle size of the precursor compounds, wherein the mixture of yttrium-stabilized zirconia balls comprises yttrium-stabilized zirconia balls having an average diameter of about 8 mm to about 12 mm and yttrium-stabilized zirconia balls of at least one smaller size and calcining the mixture of ground precursor compounds.

14. A method of preparing a photocatalyst according to claim 13, wherein the yttrium-stabilized zirconia balls of at least one smaller size have an average diameter of 6 mm or less.

15. A method of preparing a photocatalyst according to claim 13, wherein the photocatalyst prepared by the method has a general formula $A_mB_mO_{3m+2}$, wherein m has a value of 4 or 5, A is a member of the group consisting of the elements Ca, Na, Ba, K, Sr, La, Ce, Pr, Nd, In, Pb, Bi, B, and Sn, and B is a member of the group consisting of the elements Nb, Ta, Zn, Sn, and Ti.

16. A method according to claim 15, wherein the mixture of precursor compounds consists of:
    a member selected from the group consisting of carbonates and oxides of the elements of group A and
    a member selected from the group consisting of carbonates and oxides of the elements of group B.

17. A method according to claim 15, wherein the method comprises a further step of doping the photocatalyst with at least one member selected from the group consisting of nickel nitrate, nickel acetate, and $H_2PtCl_6$.

18. A method according to claim 15, wherein the step of grinding a mixture of precursor compounds is carried out in the presence of a liquid selected from the group consisting of water and alcohols.

19. A method according to claim 18, wherein the step of grinding a mixture of precursor compounds is carried out in the presence of a liquid selected from the group consisting of water, ethanol isopropanol, n-propanol, isobutanol, n-butanol, tert-butanol, ethylene glycol, diethylene glycol, ethylene, propylene glycol monoalkyl ether, propylene glycol monomethyl ether, cyclohexanol, glycerol, lower molecular weight polyethylene glycols, sec-butanol, and combinations thereof.

20. A method according to claim 18, wherein the step of grinding a mixture of precursor compounds is carried out in the presence of a protonic acid material.

21. A method according to claim 20, wherein the protonic acid material comprises a member selected from the group consisting of hydrochloric acid, sulfuric acid, nitric acid, boric acid, phosphoric acid, hydrobromic acid, propionic acid, trifluoracetic acid, acetic acid, lactic acid, oxalic acid, phosphonic acid, sulfonic acids, citric acid, maleic acid, butyric acid, glycolic acid, phytic acid, formic acid, benzoic acid, acrylic acid, methacrylic acid, and combinations thereof.

22. A method according to claim 20, wherein the protonic acid material comprises a member selected from the group consisting of nitric acid, acetic acid, and combinations thereof.

23. A method according to claim 20, wherein the protonic acid material is included in the grind in an amount of about 0.1% to about 5% by volume liquid.

24. A method according to claim 20, comprising a further step of impregnating the calcined product with a member selected from the group consisting of nickel nitrate, nickel acetate, $H_2PtCl_6$, and combinations thereof, and then calcining the impregnated product.

* * * * *

UNITED STATES PATENT AND TRADEMARK OFFICE
CERTIFICATE OF CORRECTION

| | |
|---|---|
| PATENT NO. | : 7,578,455 B2 |
| APPLICATION NO. | : 10/914418 |
| DATED | : August 25, 2009 |
| INVENTOR(S) | : Kim et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1416 days.

Signed and Sealed this

Seventh Day of September, 2010

David J. Kappos
*Director of the United States Patent and Trademark Office*